United States Patent
Lohmueller et al.

(10) Patent No.: US 9,799,002 B2
(45) Date of Patent: Oct. 24, 2017

(54) INTEGRATED PLM BASED LIBRARY MANAGEMENT SYSTEM AND METHOD

(71) Applicant: Siemens Product Lifecycle Management Software Inc., Plano, TX (US)

(72) Inventors: Helmut Lohmueller, Duesseldorf (DE); Vivek Iyer, Mason, OH (US); Lalit Chiplonkar, Mason, OH (US); Ankush Dharmale, Mason, OH (US); James Dehmlow, Bellevue, WA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 412 days.

(21) Appl. No.: 14/520,006

(22) Filed: Oct. 21, 2014

(65) Prior Publication Data

US 2015/0356504 A1 Dec. 10, 2015

(30) Foreign Application Priority Data

Jun. 10, 2014 (IN) .............................. 633/KOL/2014

(51) Int. Cl.
*G06F 9/44* (2006.01)
*G06Q 10/08* (2012.01)
*G06F 17/30* (2006.01)

(52) U.S. Cl.
CPC ..... *G06Q 10/0875* (2013.01); *G06F 17/3074* (2013.01); *G06F 8/10* (2013.01)

(58) Field of Classification Search
CPC .............................. G06F 17/30286; G06F 8/10
USPC .............. 705/29; 703/6; 707/703, 790, 794; 717/104
See application file for complete search history.

(56) References Cited

U.S. PATENT DOCUMENTS

| | | | |
|---|---|---|---|
| 2005/0080502 A1* | 4/2005 | Chernyak | G06F 17/50 716/102 |
| 2006/0167760 A1* | 7/2006 | Chakraborty | G06Q 30/02 705/26.61 |
| 2007/0168923 A1 | 7/2007 | Conner et al. | |

(Continued)

FOREIGN PATENT DOCUMENTS

WO 2007/087542 A2 8/2007

OTHER PUBLICATIONS

"AutoCAD MEP Piping Design Whitepaper," AutoCAD MEP (R2011) Enhanced Piping Design, XP055223038, Retrieved from the Internet: URL:http://autodesk.idealab.cz/new/images/stories/pdf/mep/autocad_mep_enhanced_piping_design.pdf, retrieved Oct. 22, 2015, 28 pages.

(Continued)

*Primary Examiner* — Hunter Wilder

(57) ABSTRACT

Methods for specification based augmented search. The specification based augmented search includes determining input characteristics based on a design and a user, identifying design rules associated with the input characteristics, traversing a library for library nodes including specifications that contain the design rules, displaying a plurality of library elements that correspond to the library nodes including the specifications that contain the design rules, receiving a selection of a library element from the plurality of library elements displayed, and returning a library object associated with the library element.

20 Claims, 8 Drawing Sheets

(56) References Cited

U.S. PATENT DOCUMENTS

2008/0276184 A1* 11/2008 Buffet .................... G06Q 10/10
                                                    715/752
2011/0141109 A1*  6/2011 Radet .................... G06F 3/0481
                                                    345/420
2011/0145760 A1*  6/2011 Radet ................. G06F 3/04815
                                                    715/810

OTHER PUBLICATIONS

Hutchinson, Graham et al: "IRRICAD—Computerized Irrigation Design," Management of Irrigation and Drainage Systems: Integrated Perspectives, Jul. 21-23, 1993, Park City, UT, USA, ISBN: 978-0-87262-919-6, 7 pages.

EP Search Report dated Nov. 4, 2015, for EP Application 15171413.6, 8 pages.

* cited by examiner

200

400

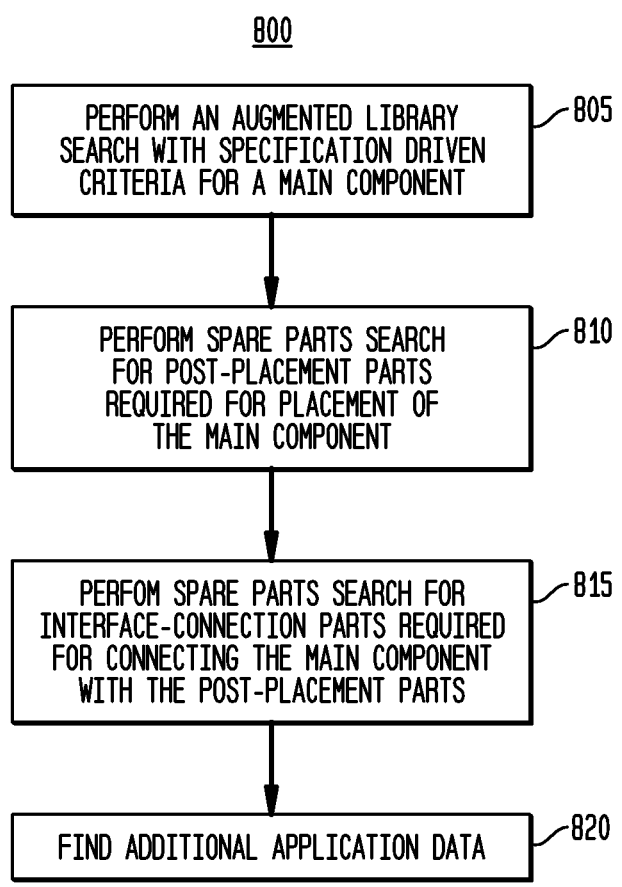

INTEGRATED PLM BASED LIBRARY MANAGEMENT SYSTEM AND METHOD

CROSS-REFERENCE TO OTHER APPLICATION

This application claims the benefit of the filing date of Indian Provisional Patent Application 633/KOL/2014, filed Jun. 10, 2014, which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include methods for specification based augmented search. The specification based augmented search includes determining input characteristics based on a design and a user, identifying design rules associated with the input characteristics, traversing a library for library nodes including specifications that contain the design rules, displaying a plurality of library elements that correspond to the library nodes including the specifications that contain the design rules, receiving a selection of a library element from the plurality of library elements displayed, and returning a library object associated with the library element.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 8 illustrates a flowchart of a specification based search in accordance with the disclosed embodiments.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

PLM systems serve as the global repository for all objects a company produces or that are used for designing and producing those objects. While it provides strong capabilities to build bill-of-material (BOM) structures representing products of any complexity, other systems do not provide general way to organize them with the goal of controlled reuse.

A library management system, as disclosed herein, provides fully integrated capabilities to define manage and use libraries of reusable parts, providing the ability to expose every object in the PDM system for reuse. In order to reduce the cost for managing and simplify the usage of libraries, among other advantages, various embodiments include innovative features, such as membership rules to automatically determine the allowable content of a library node.

Membership rules allow the dynamic population of the library based on flexible selection criteria, and support multiple sources to define the library content based on data from classification, catalogs and other libraries. Selective classification hierarchy exposure provides transparent exposure of classification functionality through a library tailored to the need of a specific task.

A library can contain a large set of objects to be used in a specific context (e.g. project). Searching components for a specific design context, like adding a valve (component) to a pipe run, requires detailed knowledge about the constraints given by government regulations and/or customer requirements.

As described herein, specifications provide a rule-based way to capture the knowledge required to find components that meet the constraints for the given context. Specification techniques disclosed herein can be tightly integrated into the library management system. Specification rules are assigned against and facilitate the library/classification hierarchy. Specifications can be shared across multiple libraries. Based on the search input criteria and the specification definition, additional criteria are injected into the library search and ensure specification-compliant search results.

In addition to finding the "main component" or "main object," specifications support the dynamic search for spare parts related to the main component and required if the main component is used. For example, the search can find flanges, washers, bolts and nuts to mount a valve onto a pipe.

Figure 1:
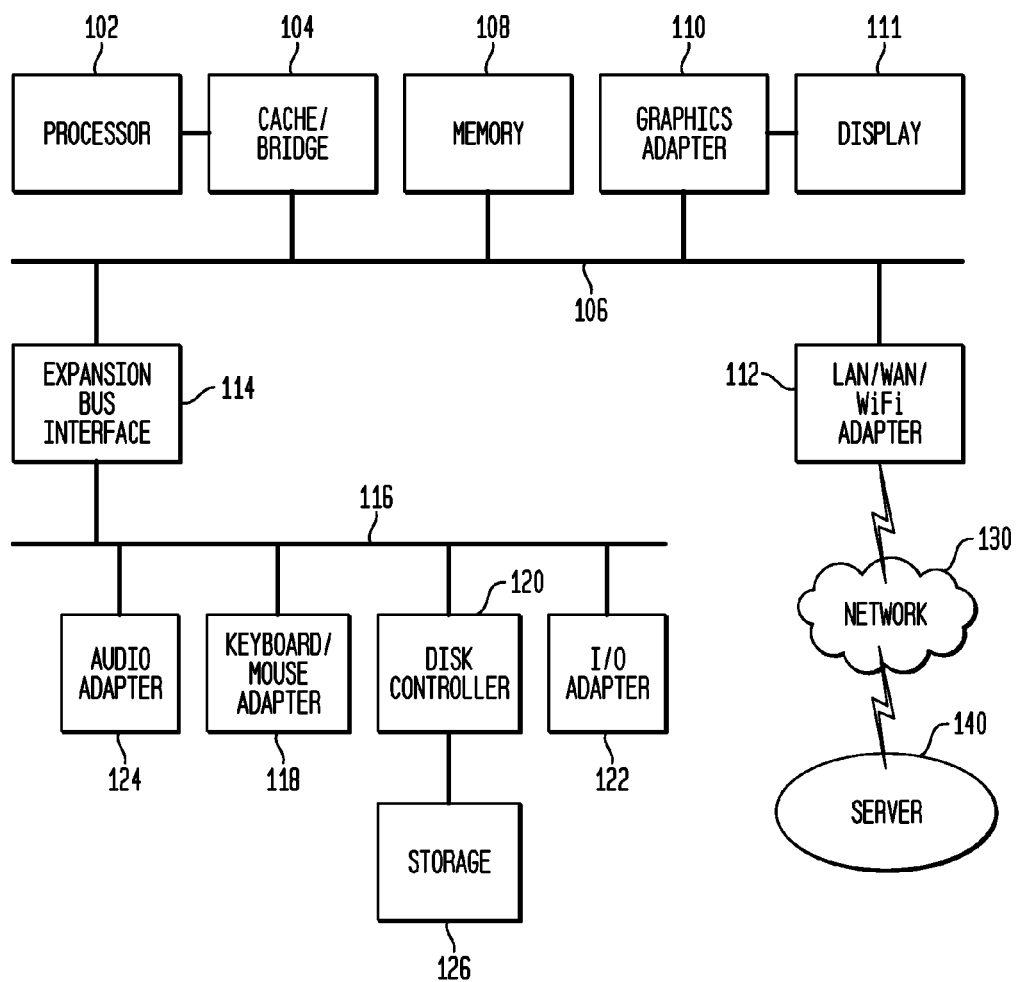
FIG. 1 illustrates a block diagram of a data processing system in which an embodiment can be implemented.

FIG. 1 illustrates a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
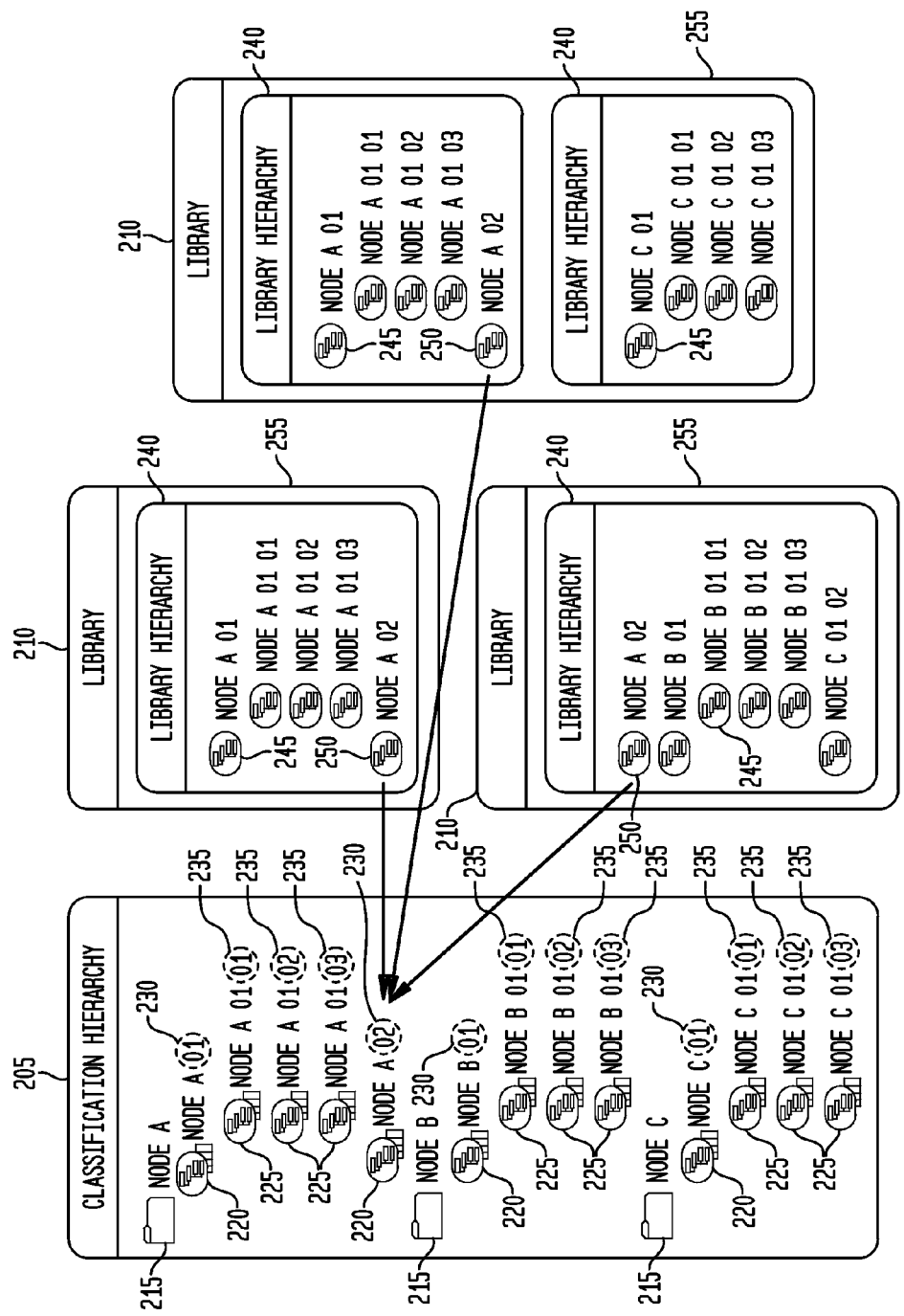
FIG. 2 illustrates a library management system with a classification hierarchy and multiple libraries in accordance with disclosed embodiments.

FIG. 2 illustrates a library management system 200 with a classification hierarchy 205 and multiple libraries 210 in accordance with disclosed embodiments.

The classification hierarchy 205 is a classification structure comprised of design elements, for example, groups 215 and classes 220. The classification hierarchy 205 can be defined by a user to allow particular design elements in the classification hierarchy 205 to be searched for and to re-use related product and process data in new projects or programs. The classification hierarchy 205 stores design elements for a number of different libraries 210, which reduces inventory by standardizing the design products and methods used in different projects. A classification hierarchy 205 reduces search time by not requiring searching multiple libraries 210. The classification hierarchy 205 ensures uniqueness of the design elements through classification characteristics, updating the design elements when a change is made and eliminating duplication of definition data in different libraries 210.

A group 215 is a high level hierarchy node in the classification hierarchy 205. More than one group 215 can be included in the classification hierarchy 205. Each group 215 is comprised of classes 220 or other groups 215. Groups 215, as well as classes 220, can be searched for in the classification hierarchy 205.

A class 220 is a hierarchy node found in the classification hierarchy 205. While a group 215 can include more than one class 220, each specific class 220 is found in only one group 215. Classes 220 support the addition of attributes added by a user and are designed to be used in searches against the design elements assigned to the class 220 in the classification hierarchy 205. Classes 220 can include subclasses 225 that function similarly to classes 220, including containing further subclasses 225. Attributes applied to the class 220 are inherited by the children subclasses 225, ensuring consistency on attribute definitions across the subclasses 225 found in the class 220.

Abstract classes 230 and storage classes 235 are two types of classes 220 included in the classification hierarchy 205. An abstract class 230 defines common attributes valid for all the children subclasses 225. Abstract classes 230 support searching across all children subclasses 225. Storage classes 235 typically are leaf classes of the classification hierarchy 205, but may also contain subclasses 225. Internal classification objects (ICOs) are stored in storage classes 235.

The library management system 200, in various embodiments, includes libraries 210, library hierarchies 240, and library nodes 245. While referring to a single classification hierarchy 205, the library management system 200 can include multiple libraries 210. Along with multiple libraries 210, the library management system 200 provides functionality for hierarchical organization, classification support, rule based data population, rule based configuration, workflow support, importing, and exporting.

The library 210 acts as a container 255 for all library hierarchies 240 and library nodes 245 related to the library 210. A library 210 can support multiple independent library hierarchies 240 and comprises at least one library hierarchy 240. Libraries 210 can be set up based on technical or business constraints and can be created based on usage, including general use, domain specific use, project specific use or any other suitable type of usage. Libraries 210 provide functionality for a user such as browsing, searching, retrieving, publication, retraction and instantiation support. The publication operation of the library 210 allows users to add new objects to the library 210 for further reuse. The retract operation of the library 210 allows the removal of objects from a library. The instantiate operation of the library 210 defines the process of adding an object into a design, including tracking and reporting on the usage of the object.

The library hierarchy 240 provides a hierarchical organization to structure the contents of the library 210. The library hierarchy 240 can be built using library nodes 245.

A classification hierarchy 205 can classify a library 210. A classifying node 250 is created when a library node 245 links to a class 220 in the classification hierarchy 205. Each classifying node 250 maintains a reference to the corresponding class 220 from the classification hierarchy 205. With this information, a classifying node 250 has the ability to seamlessly expose classification capabilities of the classes 220 like classify and search. While each class 220 can only exist in one location of the classification hierarchy 205, a library 210, as described herein, can expose one class 220 in many locations as different classifying nodes 250. Multiple representations for visualization can be attached to the hierarchy node, including icons, images, and application specific representations. These visual representations of the hierarchy nodes are inherited by the child nodes until the representations are overwritten.

Figure 3A:
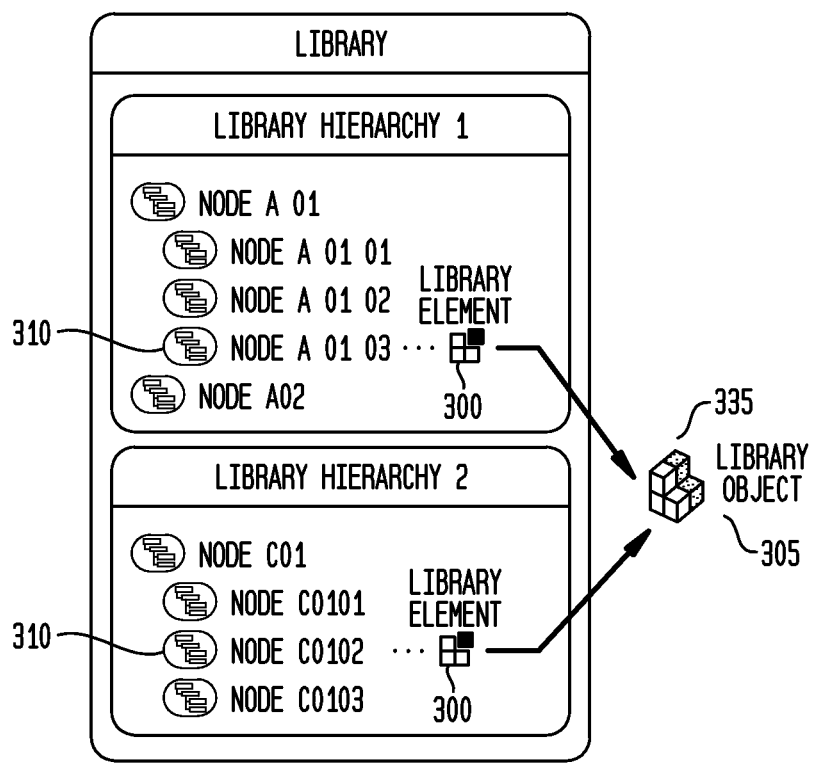
FIG. 3A illustrates library elements exposing a library object to an associated node in a library in accordance with disclosed embodiments.

FIG. 3A illustrates library elements 300 exposing a library object 305 to an associated node 310 in a library in accordance with disclosed embodiments.

Library elements 300 expose and connect the library objects 305 into a library. Each library element 300 is assigned, manually or automatically using a rule based mechanism, to only one associated node 310 per library hierarchy. An associated node 310 is a library node 245 associated with a library element 300. A library object 305 can be assigned to multiple hierarchy nodes through the respective library elements 300. A separate library element 300 is created for each occurrence of the same library object 305. The library element 300 inherits the classification from the associated node 310, which allows the exposure of library objects 305 into any number of libraries reusing the classification. Library elements 300 also inherit the representation of the associated node 310.

Figure 3B:
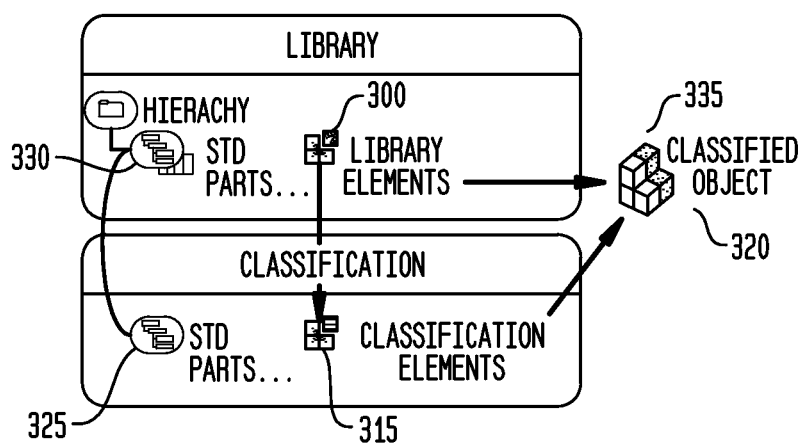
FIG. 3B illustrates a classification element exposing a classified object to an associated class in a classification hierarchy in accordance with disclosed embodiments.

FIG. 3B illustrates a classification element 315 exposing a classified object 320 to an associated class 325 in a classification hierarchy in accordance with disclosed embodiments.

A classified object 320 is classified according to the underlying associated class 325 by creating a classification element 315. Classification elements 315 provide support for the classification data and connect classified objects 320 to the classification hierarchy. Each classification element 315 is assigned to one associated class 325 and inherits the representations from the associated class 325. A classified object 320 can be assigned to multiple classification elements 315 in the hierarchy. Allowing multiple classification element 315 assignments allows the same classified object 320 to have multiple characteristics, for example an object including mechanical characteristics and electrical characteristics. The properties of the associated class 325 support searching and viewing of the classification element 315. Adding objects 335 to a classifying node 330 will create a classification element 315 and therefore classified object 320. An object 335 can be both a library object 305 and a classified object 320 associated with respective associated nodes 310 and associated classes 325.

Figure 4:
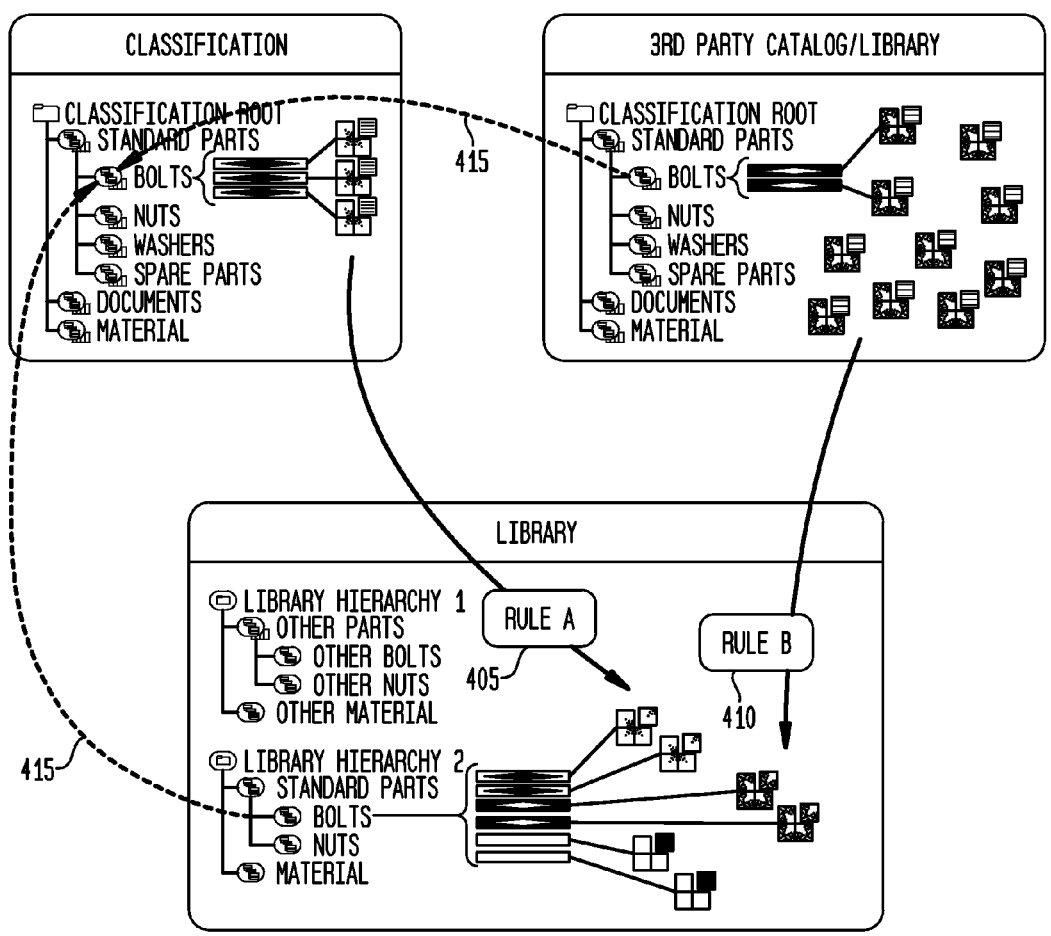
FIG. 4 illustrates associating membership rules in accordance with disclosed embodiments.

FIG. 4 illustrates associating membership rules 400 in accordance with disclosed embodiments. Membership rules 400 can be classification membership rules 405 or other membership rules 410.

Disclosed embodiments can implement membership rules 400. Membership rules 400 provide a rule based approach to populate a library. Implementing membership rules 400 allows objects to be loaded into the library based on underlying classifications 415. A key aspect of a library is to precisely define the content of the same. Using hierarchy nodes it is possible to clearly identify the classes from the classification hierarchy to be exposed. Based on the library hierarchy, classification membership rules 405 allow the rule based definition of the object to be loaded into each node of the library, by finding classified objects and creating library elements. In addition to membership rules 400 selecting classified objects from the classification classes, other membership rules 410 allow selecting objects from other libraries based on the common underlying classification 415. Membership rules 400 allow searching and filtering based on attributes found within the class and underlying classification 415.

Each membership rule 400 is associated to a node in the hierarchy. Each child node without its own defined membership rules 400 inherits the membership rules 400 from its parent reducing the configuration effort. A single node can have any number of membership rules 400 attached, each referencing its own source.

Membership rules 400 contain a reference to the source, which can be from one of the following categories: classification class, library nodes from other libraries, and other PLM internal object types. In addition to the source, membership rules 400 contain a list of expressions that are used to further identify the objects to select. Any property on the source can be used for this. E.g. "diameter>10" or "material=steel."

Populating the library will be achieved by evaluating the membership rules 400. Explicit evaluation using the membership rules 400 also provides control when the library content is updated. The evaluation can happen upon request, periodically or triggered by the addition of new objects to the referenced classification or library. The evaluation can identify each object that need to be added according to the membership rules 400 and compare this with the already existing library elements to avoid duplicate entries. Existing library elements that are no longer selected by the membership rules 400 can be removed from the library.

Besides using membership rules 400, objects can be "manually" added to a library using a publication mechanism that creates content only available in the local library. Publication provides a mechanism to control additions through access control and approval processes. The library elements created to support publication objects will not be affected by membership evaluation.

Instantiation defines the process of adding an object into a design and controls the tracking and reporting of usage of the object. From a library point of view, instantiation is the handover of the object into the design and the ability to track the usage of the library element.

Figure 5:
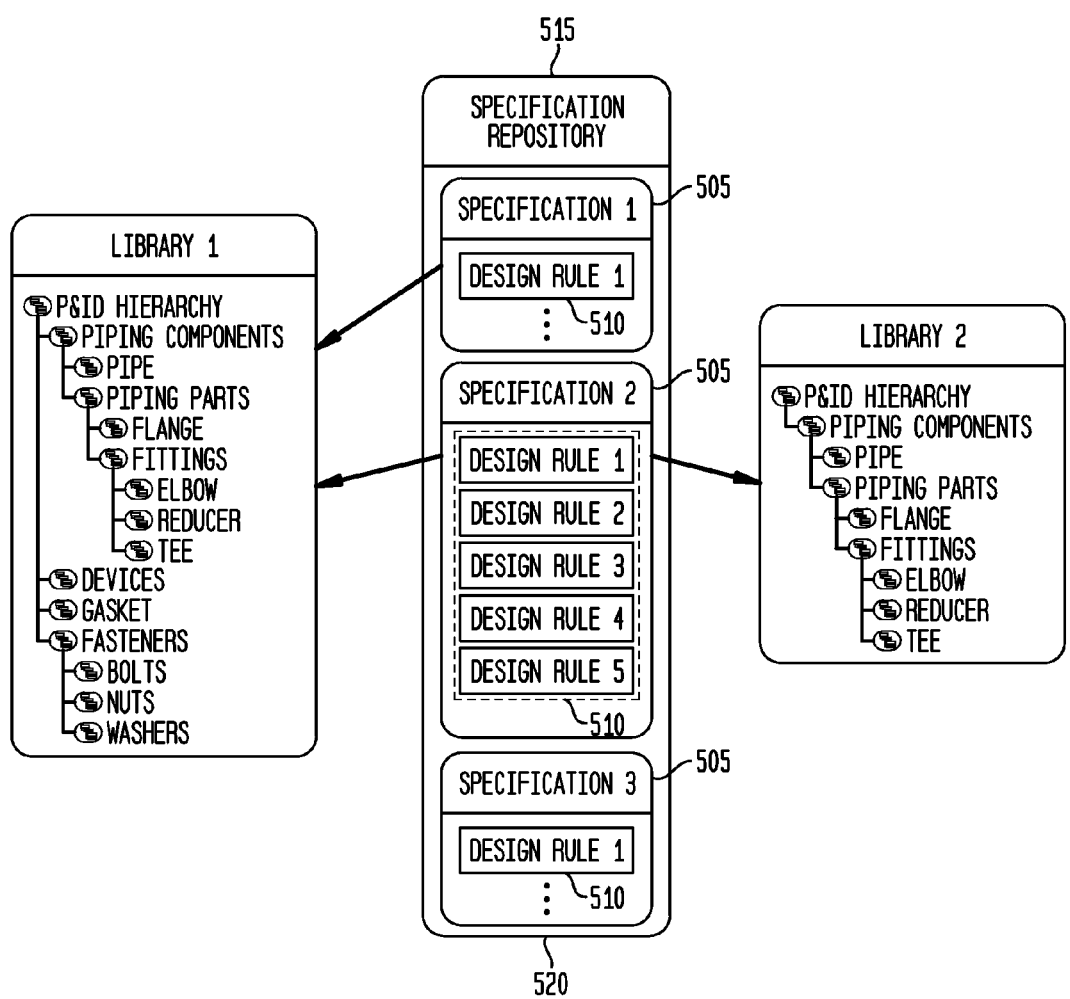
FIG. 5 illustrates specification management with multiple specifications, each including design rules, contained in a specification repository in accordance with disclosed embodiments.

FIG. 5 illustrates specification management 500 with multiple specifications 505, each including design rules 510, contained in a specification repository 515 in accordance with disclosed embodiments.

While the library management system supports sets of reusable data for projects, many components are not applicable when searching for additional components for specific design tasks that are constrained by rules and regulations, like creating a pipe run. The concept of a specification 505 provides a design rule 510 based configuration that guides the user to find only those components suitable to the design context. Specifications 505 are created by expert users for the corresponding domain or discipline and can be defined by government bodies, customers or internally to ensure the consistency in the design of complex products. In order to ensure that these design rules 510 are followed, the system can also define and enforce these specifications 505. Specifications 505 are created in a specification repository 515 and in the context of a library. Specifications 505 can be stored and managed separately from libraries, which provide the ability to be used by multiple libraries, and are coupled with the library hierarchy based on unique library node IDs. The specification repository 515 is a container 520 for the specifications 505.

Specification management 500, as disclosed herein, provides a flexible and seamlessly integrated extension to the library management system providing the ability to define the specifications 505 allowing a customer to capture reuse knowledge and ensuring compliant component selection, among other benefits. Specification management 500 enhances the basic library search by accepting specification information as additional input, which helps the user to make the right decision while selecting components for a specific design task.

Figure 6:
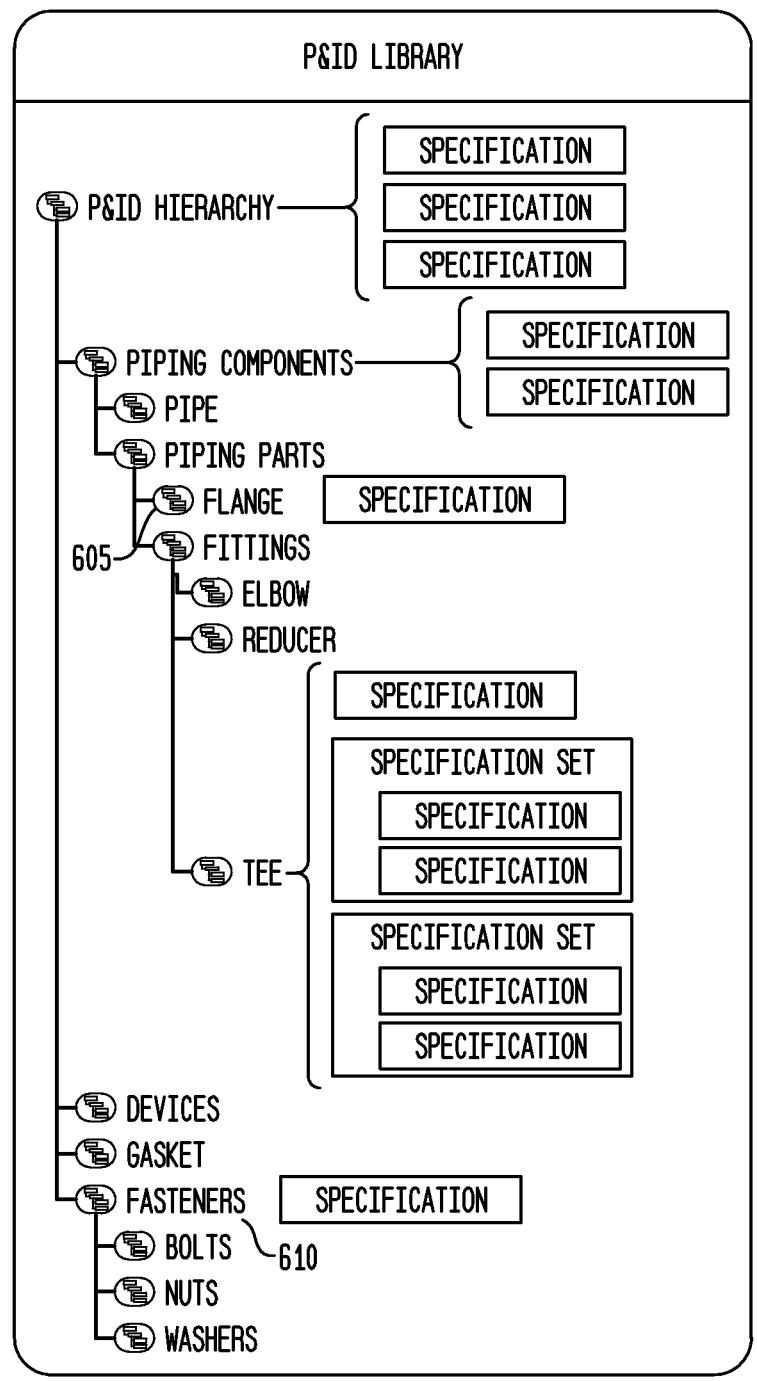
FIG. 6 illustrates an augmented library in accordance with disclosed embodiments.

FIG. 6 illustrates an augmented library 600 in accordance with disclosed embodiments.

The library management system can augment the library search with specification driven criteria, by evaluating the applicable specifications based on the hierarchy node selected for the search. The augmented library 600 uses the library hierarchy for the child nodes to inherit the specifications from all parent nodes, unless overridden.

Additional criteria describing the context for the augmented library 600, such as fluid and pressure, passed into the process can be used to further narrow down the list of applicable specifications.

Based on the evaluated specifications, the library management system can generate the final expressions to be injected into the process. These expressions are added to the other search criteria the user passed into the augmented library 600.

When additional components are required in order to use a component in a design, the library management system performs a spare parts search. The specifications system provides support for additional types of spare parts, including post-placement parts 605 and interface-connection parts 610. Spare parts can be implemented as actions sets and action definitions reusing the same dynamic rules based approach used to identify the "main" parts. The ability to identify spare parts is integrated into the library search capability and can be return with the search result as extended data.

Post-placement parts 605 are spare parts required by a specific component type for placement in a design. The definitions for post-placement parts 605 are associated to specific nodes in the hierarchy, representing component types. Any number and combination of post-placement parts 605 can be added to a node.

Interface-connection parts 610 are spare parts that are required to assemble two components based on their interfaces. The interfaces are independent of the component type, which allows the library management system to independently define the interfaces that can exist on different component types.

The specification management can also detect the required combination and provide required spare parts as part of the extended search result data.

Figure 7A:
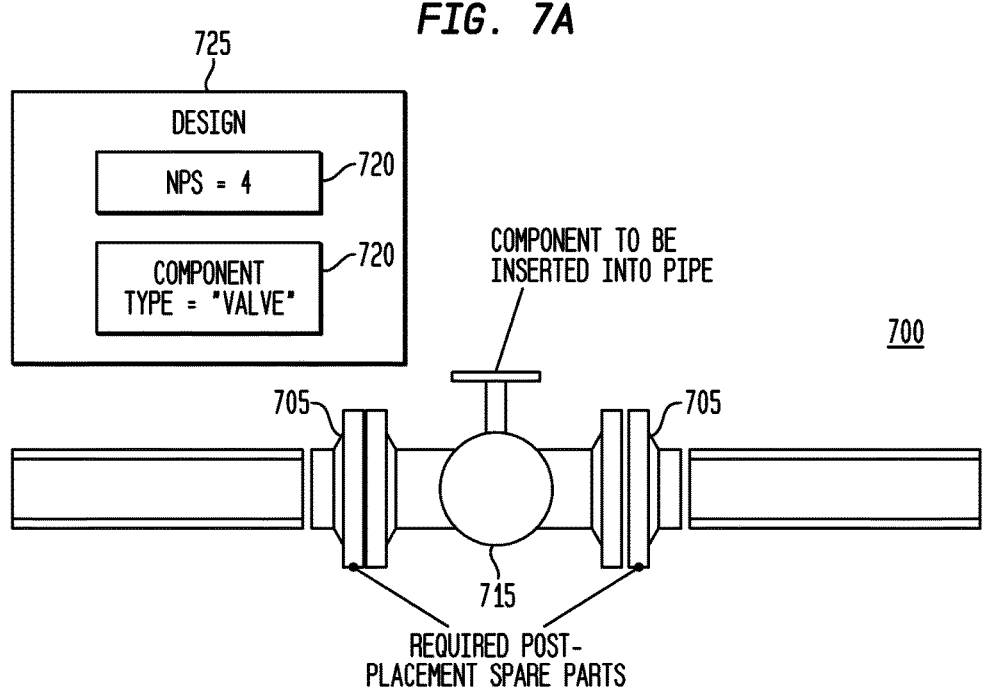
FIGS. 7A and 7B illustrate a spare part search for post-placement parts and interface-connection parts for placement and connection of a main component.
Figure 7B:
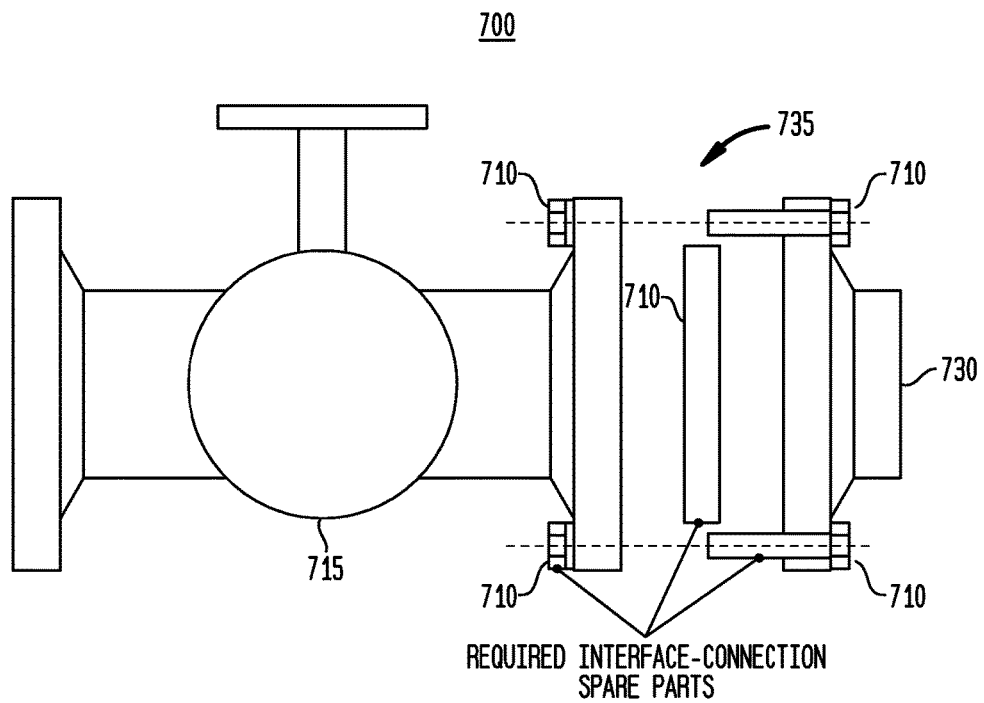

FIGS. 7A and 7B illustrate a spare part search 700 for post-placement parts 705 and interface-connection parts 710 for placement and connection of a main component 715. FIG. 7A illustrates the placement of a main component 715 using post-placement parts 705 in accordance with disclosed embodiments. In this example, the input characteristics 720 of the design 725 require a main component 715, valve, to be added to a pipe. The placement of the main component 715 requires two post-placement parts 705, flanges, to configure the pipe for placement.

FIG. 7B illustrates the connection of a main component 715 using interface-connection parts 710 in accordance with disclosed embodiments. The main component 715 can have different interfaces, such as flange and weld. In this example, the design 725 requires a main component 715 configured with a flange interface to be connected with the flange of another component 730 and defined for a connection combination 735, flange/flange. The illustrated connection combination 735 requires interface-connection parts 710, such as bolts, nuts, and a washer.

FIG. 8 illustrates a flowchart of a specification based search 800 in accordance with the disclosed embodiments.

In step 805, the library management system performs an augmented library search with specification driven criteria for a main component. The library management system receives input characteristics for the main component from a user and the design. In a piping system, the library management system might receive characteristics from the design, such as, nominal pipe size (NPS), the inner diameter of the pipe, the thickness of the pipe, etc. The characteristic received from the user at this point is normally the "component type," but the user could also require a component using a different NPS, inner diameter of the pipe, thickness of the pipe, etc. The library management system uses the characteristics received to identify the design rules applicable for the characteristics. The library is then searched using the identified design rules and a list of components is returned to the user. The search is performed by the library management system traversing the library for library nodes including the specifications that contain the identified design rules. Once the library is traversed, the library management system displays or transmits, to an external display, the plurality of library elements that correspond to the library node including the specifications that contain the design rules. Once the system receives a selection of a library element from the plurality of elements displayed, the library management system returns a library object associated with the library element.

In step 810, the library management system performs a spare part search for post-placement part required for the placement of the library object. In some embodiments, the library object is a main component. The post-placement configuration defines the type of the post-placement parts and the design rules how to search for them. For each configured component, the system performs a search based on the characteristics defined by the main component and by applying the post-placement design rules. The identified components are returned to the user along with the main part.

In step 815, the library management system performs a spare part search for interface-connection parts required for connecting the main component with the post-placement parts identified by step 810. Based on the interface connection configuration that identifies the required component types and the design rules how to search for them, the system determines all the necessary interface-connection parts and adds them to the result returned to the user.

In step 820, the library management system finds additional application data on the main component, the plurality of post-placement parts, and the plurality of interface-connecting parts. Any additional options are passed to the application along with the selected components, such as changing visibility of certain component or features in the model.

Specification management is applicable to multiple domains, including but not limited to piping and electronic wiring, as well as across applications. By providing this capability in a generic and central way it enables the extended use of this feature across new domains and applications.

Of course, those of skill in the art will recognize that, unless specifically indicated or required by the sequence of operations, certain steps in the processes described above may be omitted, performed concurrently or sequentially, or performed in a different order.

Disclosed embodiments can use dynamic rule based configuration of library content. Disclosed embodiments include the ability to build multiple domain, application or project based libraries, and an integrated classification capability. Disclosed embodiments include a configurable library element sharing the underlying data.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC §112(f) unless the exact words "means for" are followed by a participle.

What is claimed is:

1. A product data management (PDM) data processing system comprising:
    a processor; and
    an accessible memory, wherein the processor is particularly configured to:
        determine input characteristics for a main component to be added in a design model;
        identify design rules associated with the input characteristics;
        traverse a library for library nodes including specifications that contain the design rules;
        display a plurality of library elements that correspond to the library nodes that include the specifications containing the design rules;
        receive a selection of a library element from the plurality of library elements displayed;
        return a library object associated with the library element wherein the main component is the library object associated with the library element;
        perform a spare part search for a plurality of post-placement parts required for placement of the main component, wherein the plurality of post-placement parts are associated with post-placement part objects;
        perform a spare part search for a plurality of interface-connecting parts required for connection of the main component, wherein the plurality of interface-connecting parts are associated with interface-connecting part objects;
        add the main component to the design model along with the post-placement part objects and the interface-connecting part objects; and
        display the design model in a display window of a graphical user interface showing placement and connection of the main component, the post-placement part objects and the interface-connecting part objects according to the design rules.

2. The PDM data processing system of claim 1, further comprises:

find additional application data on the main component, the plurality of post-placement parts, and the plurality of interface-connecting parts.

3. The PDM data processing system of claim 1, further comprises:
provide the library, wherein the library acts as a container for all library hierarchies and library nodes related to the library and comprises at least one library hierarchy;
provide the at least one library hierarchy, wherein each of the at least one library hierarchy provides a hierarchical organization to structure a plurality of library nodes; and
provide a library element, wherein the library element exposes the library object to the library.

4. The PDM data processing system of claim 3, further comprising:
classify the library with a classification hierarchy, wherein the classification hierarchy provides a hierarchical organization to structure groups and classes.

5. The PDM data processing system of claim 4, wherein to classify the library comprises referencing library nodes to classes to create classifying nodes, wherein a classifying node maintains a reference to a corresponding class from the classification hierarchy.

6. The PDM data processing system of claim 3, further comprising:
associate the library with specifications from a specification repository, wherein the specification repository is a container for the specifications, and wherein the specifications comprises the design rules.

7. The PDM data processing system of claim 3, further comprising:
implement membership rules that allow objects to be loaded into the library based on an underlying classification.

8. A method for specification based augmented search in a product data management (PDM) data processing system, comprising:
determining, by a processor, input characteristics for a main component to be added in a design model;
identifying, by the processor, design rules associated with the input characteristics;
traversing a library for library nodes including specifications that contain the design rules;
displaying, on a display, a plurality of library elements that correspond to the library nodes that include the specifications containing the design rules;
receiving a selection of a library element from the plurality of library elements displayed;
returning a library object associated with the library element, wherein the main component is the library object associated with the library element;
performing a spare part search for a plurality of post-placement parts required for placement of the main component, wherein the plurality of post-placement parts are associated with post-placement part objects;
performing a spare part search for a plurality of interface-connecting parts required for connection of the main component, wherein the plurality of interface-connecting parts are associated with interface-connecting part objects;
adding, by the processor, the main component to the design model along with the post-placement part objects and the interface-connecting part objects; and
displaying, on the display, the design model in a display window of a graphical user interface showing placement and connection of the main component, the post-placement part objects and the interface-connecting part objects according to the design rules.

9. The method of claim 8, further comprises:
finding additional application data on the main component, the plurality of post-placement parts, and the plurality of interface-connecting parts.

10. The method of claim 8, further comprising:
providing the library, wherein the library acts as a container for all library hierarchies and library nodes related to the library and comprises at least one library hierarchy;
providing the at least one library hierarchy, wherein each of the at least one library hierarchy provides a hierarchical organization to structure a plurality of library nodes; and
providing a library element, wherein the library element exposes the library object to the library.

11. The method of claim 10, further comprising:
classifying the library with a classification hierarchy, wherein the classification hierarchy provides a hierarchical organization to structure groups and classes.

12. The method of claim 11, wherein classifying the library comprises referencing library nodes to classes to create classifying nodes, wherein a classifying node maintains a reference to a corresponding class from the classification hierarchy.

13. The method of claim 10, further comprising:
associating the library with specifications from a specification repository, wherein the specification repository is a container for the specifications, and wherein the specifications comprises the design rules.

14. The method of claim 10, further comprising:
implementing membership rules that allow objects to be loaded into the library based on an underlying classification.

15. A non-transitory computer-readable medium encoded with executable instructions that, when executed, cause one or more processors of associated product data management (PDM) data processing systems to perform the steps of:
determining input characteristics for a main component to be added in a design model;
identifying design rules associated with the input characteristics;
traversing a library for library nodes including specifications that contain the design rules;
displaying a plurality of library elements that correspond to the library nodes that include the specifications containing the design rules;
receiving a selection of a library element from the plurality of library elements displayed;
returning a library object associated with the library element, wherein the main component is the library object associated with the library element;
performing a spare part search for a plurality of post-placement parts required for placement of the main component, wherein the plurality of post-placement parts are associated with post-placement part objects;
performing a spare part search for a plurality of interface-connecting parts required for connection of the main component, wherein the plurality of interface-connecting parts are associated with interface-connecting part objects;
adding the main component to the design model along with the post-placement part objects and the interface-connecting part objects; and
displaying the design model in a display window of a graphical user interface showing placement and connection of the main component, the post-placement part objects and the interface-connecting part objects according to the design rules.

16. The computer-readable medium of claim 15, further comprising:
finding additional application data on the main component, the plurality of post-placement parts, and the plurality of interface-connecting parts.

17. The computer-readable medium of claim 15, further comprising:
providing the library, wherein the library acts as a container for all library hierarchies and library nodes related to the library and comprises at least one library hierarchy;
providing the at least one library hierarchy, wherein each of the at least one library hierarchy provides a hierarchical organization to structure a plurality of library nodes; and
providing a library element, wherein the library element exposes the library object to the library.

18. The computer-readable medium of claim 17, further comprising:
classifying the library with a classification hierarchy, wherein the classification hierarchy provides a hierarchical organization to structure groups and classes.

19. The computer-readable medium of claim 18, wherein classifying the library comprises referencing library nodes to classes to create classifying nodes, wherein a classifying node maintains a reference to a corresponding class from the classification hierarchy.

20. The computer-readable medium of claim 17, further comprising:
associating the library with specifications from a specification repository, wherein the specification repository is a container for the specifications, and wherein the specifications comprises the design rules.

* * * * *